United States Patent
Takai

(10) Patent No.: US 11,007,737 B2
(45) Date of Patent: May 18, 2021

(54) CUTTING DEVICE

(71) Applicant: Sumitomo Rubber Industries, Ltd., Kobe (JP)

(72) Inventor: Yuichi Takai, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 16/083,360

(22) PCT Filed: Jan. 13, 2017

(86) PCT No.: PCT/JP2017/000947
§ 371 (c)(1),
(2) Date: Sep. 7, 2018

(87) PCT Pub. No.: WO2017/154344
PCT Pub. Date: Sep. 14, 2017

(65) Prior Publication Data
US 2019/0099969 A1    Apr. 4, 2019

(30) Foreign Application Priority Data
Mar. 9, 2016    (JP) .............................. JP2016-046079

(51) Int. Cl.
*B29D 30/46* (2006.01)
*B29D 30/08* (2006.01)

(52) U.S. Cl.
CPC ............. *B29D 30/46* (2013.01); *B29D 30/08* (2013.01); *B29D 2030/463* (2013.01); *B29D 2030/466* (2013.01)

(58) Field of Classification Search
CPC .. B29D 30/46; B29D 30/08; B29D 2030/466; B29D 2030/463
See application file for complete search history.

(56) References Cited

U.S. PATENT DOCUMENTS 3,962,022 A * 6/1976 Bottasso ................ B29C 65/00
156/507
4,922,774 A    5/1990 Oldeman

FOREIGN PATENT DOCUMENTS

| DE | 10 2014 211 561 A1 | 12/2015 |
|----|---|---|
| EP | 0 406 821 A2 | 1/1991 |
| JP | 58-59830 A | 4/1983 |

(Continued)

OTHER PUBLICATIONS

Extended European Search Report for European Application No. 17762691.8, dated Oct. 4, 2019.
(Continued)

*Primary Examiner* — Sarang Afzali
(74) *Attorney, Agent, or Firm* — Birch, Stewart, Kolasch & Birch, LLP

(57) ABSTRACT

To accurately cut a ply for a tire. It is a cutting device 1 for cutting a ply 10 for a tire in which a plurality of cords 12 parallelly arranged at fixed pitches are coated with an unvulcanized topping rubber 10. It has a pitch increasing means 2 for increasing the pitches of the cords 12 by pressing the ply 10 from a second surface 10b side to a first surface 10b side of the ply 10 so as to stretch the ply 10 toward the first surface 10a side; and a ply cutting means 3 disposed on the first surface 10a side of the ply 10, for cutting the stretched portion of the ply 10 along the cords 12.

6 Claims, 8 Drawing Sheets

(56) References Cited

FOREIGN PATENT DOCUMENTS

| | | | |
|---|---|---|---|
| JP | 1-216796 A | | 8/1989 |
| JP | 6-155632 A | | 6/1994 |
| JP | 06155632 A | * | 6/1994 |
| JP | 2000-141510 A | | 5/2000 |
| JP | 2007-313791 A | | 12/2007 |
| JP | 2010-125685 A | | 6/2010 |
| JP | 2011-225152 A | | 11/2011 |
| JP | 2016-501 A | | 1/2016 |

OTHER PUBLICATIONS

Written Opinion (PCT/ISA/237) issued in PCT/JP2017/000947, dated Apr. 4, 2017.

* cited by examiner

FIG.2
(a)
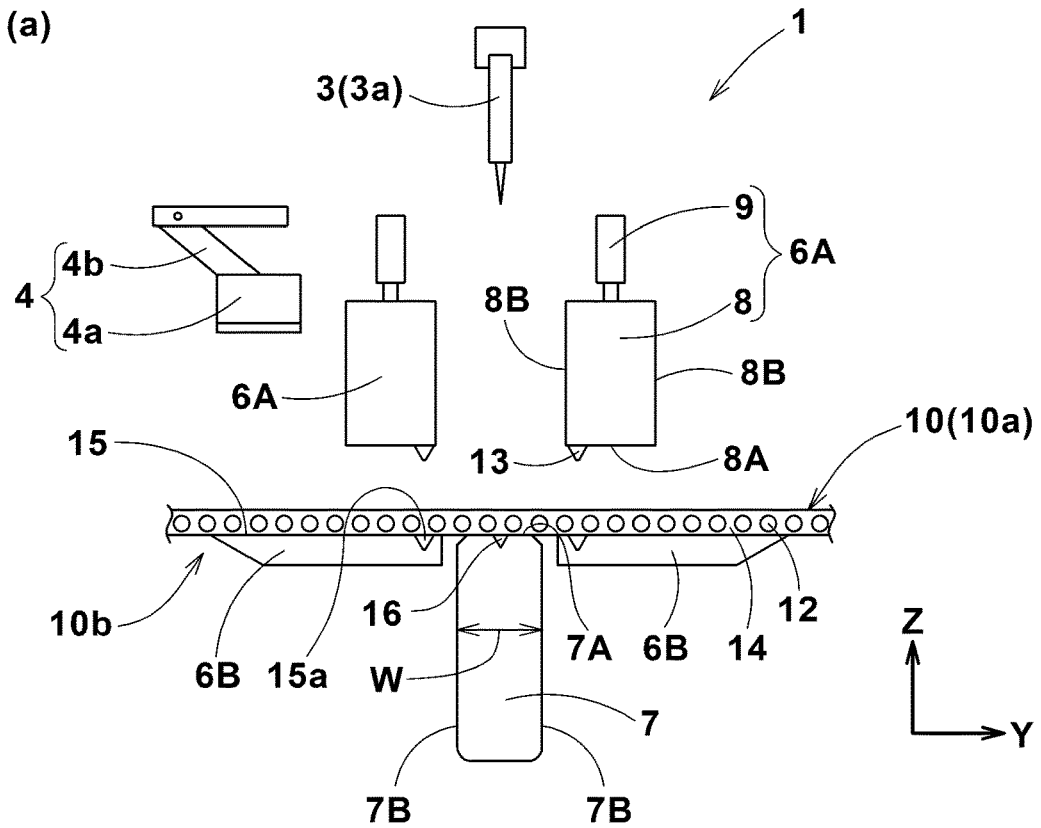
(b)
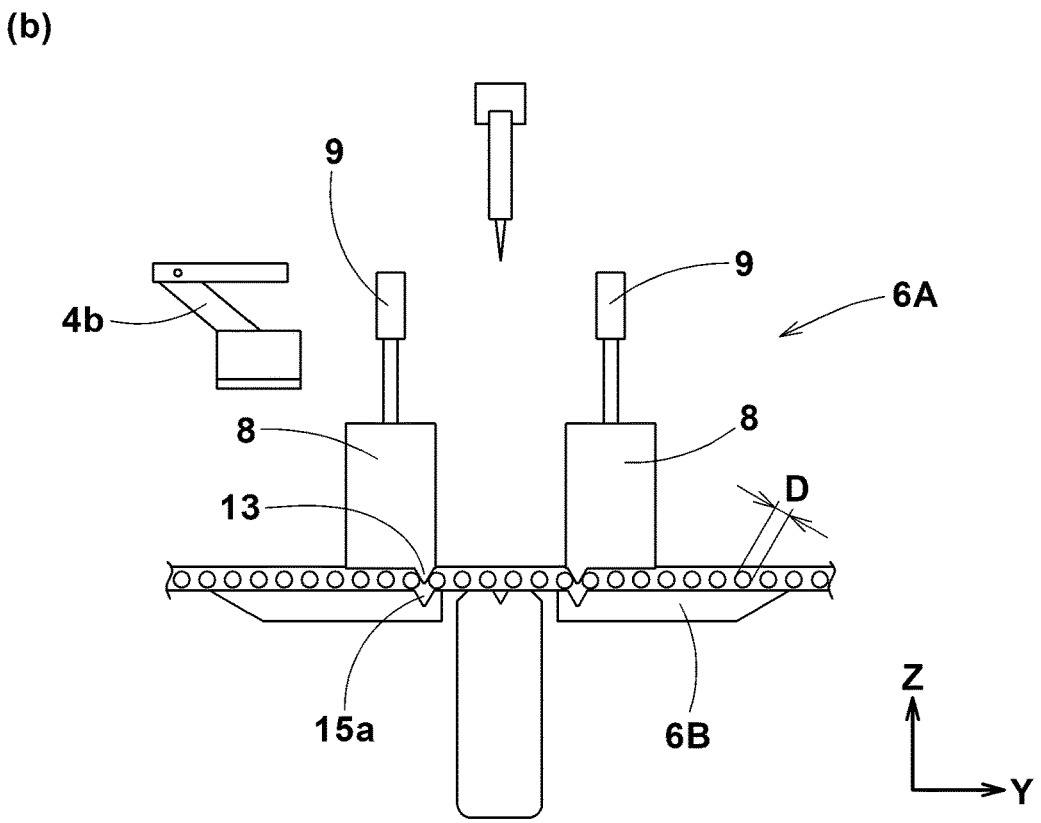

FIG.3
(a)
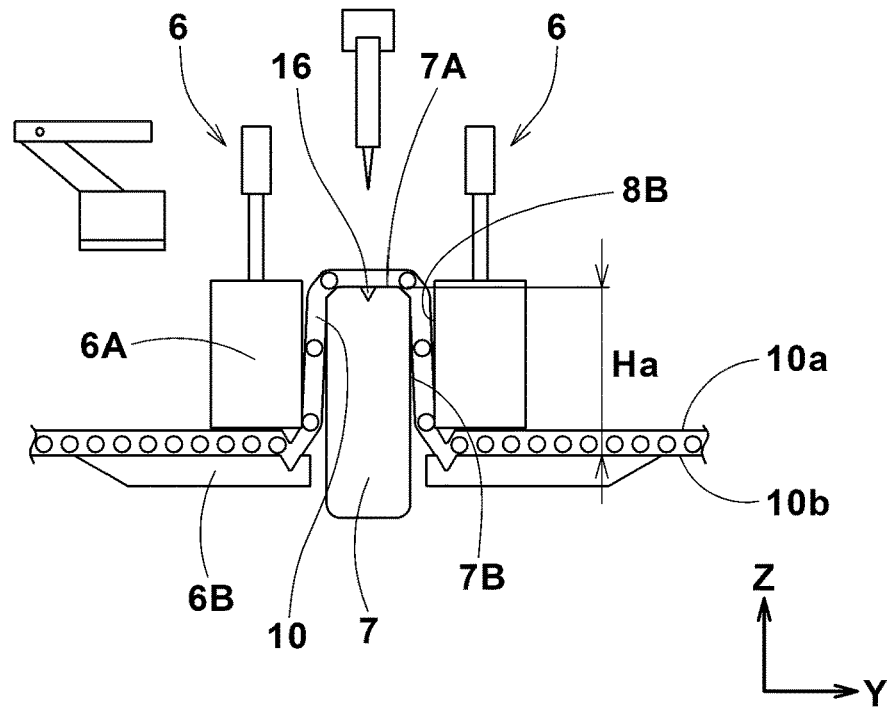
(b)
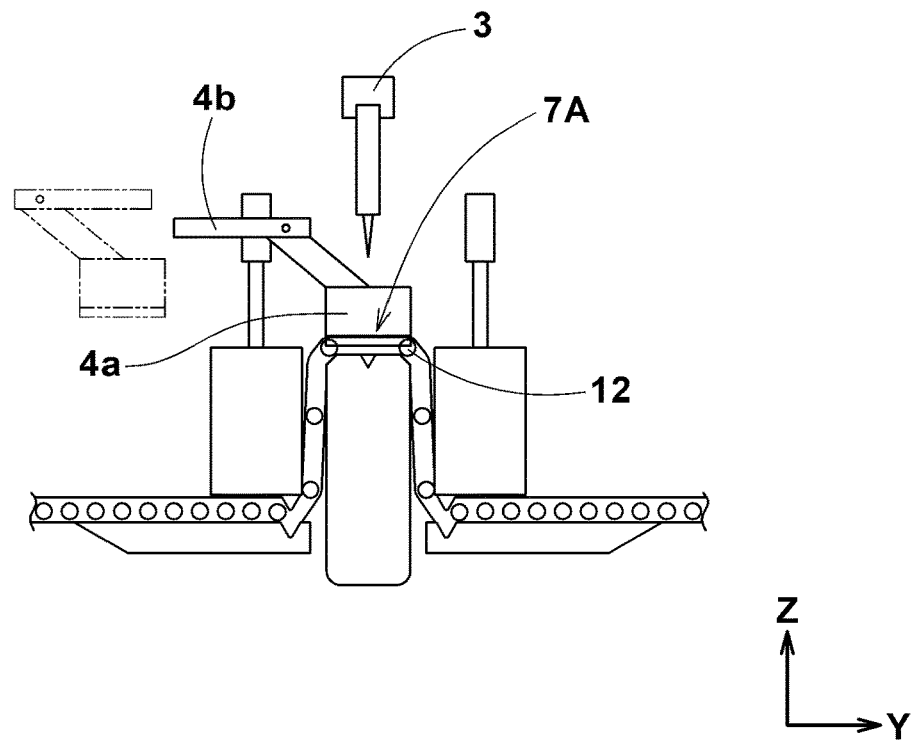

FIG.4
(a)
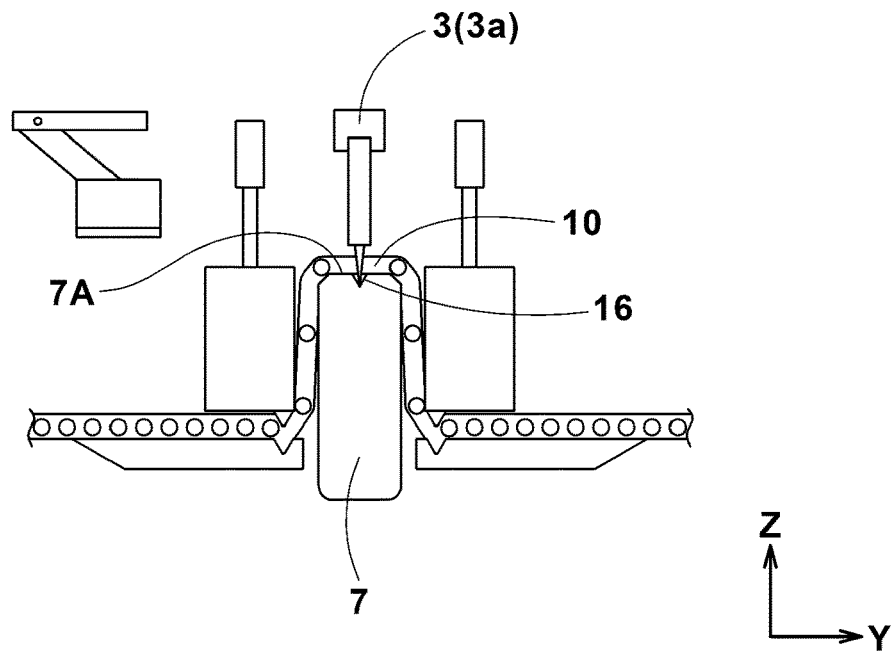
(b)
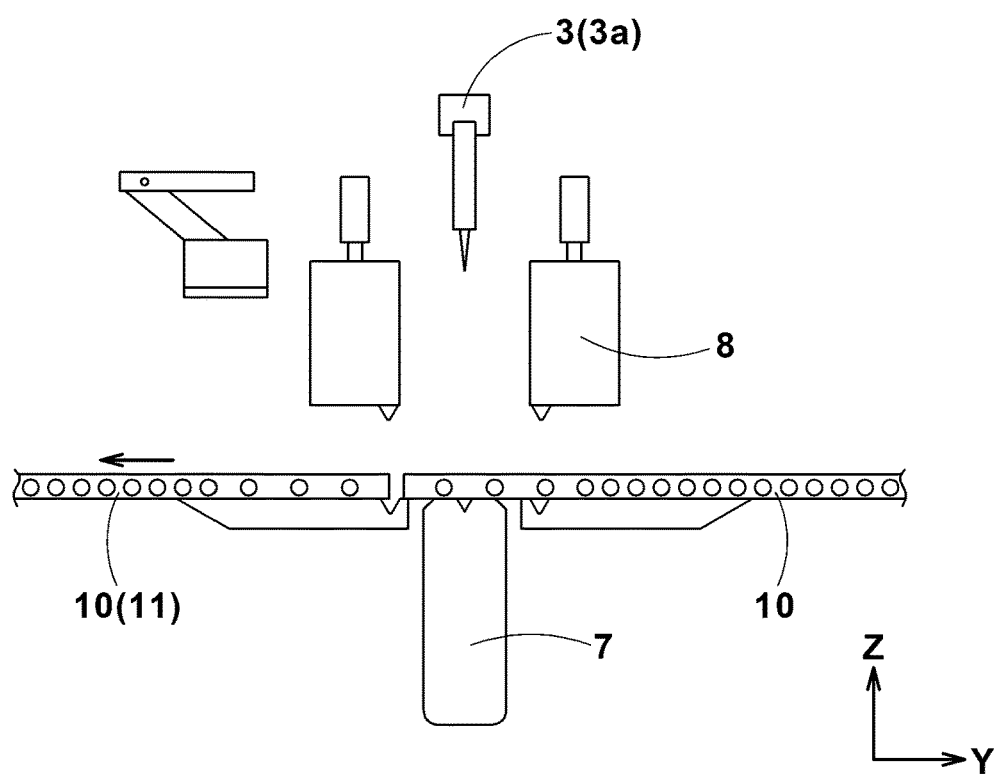

FIG.7 --PRIOR ART--
(a)
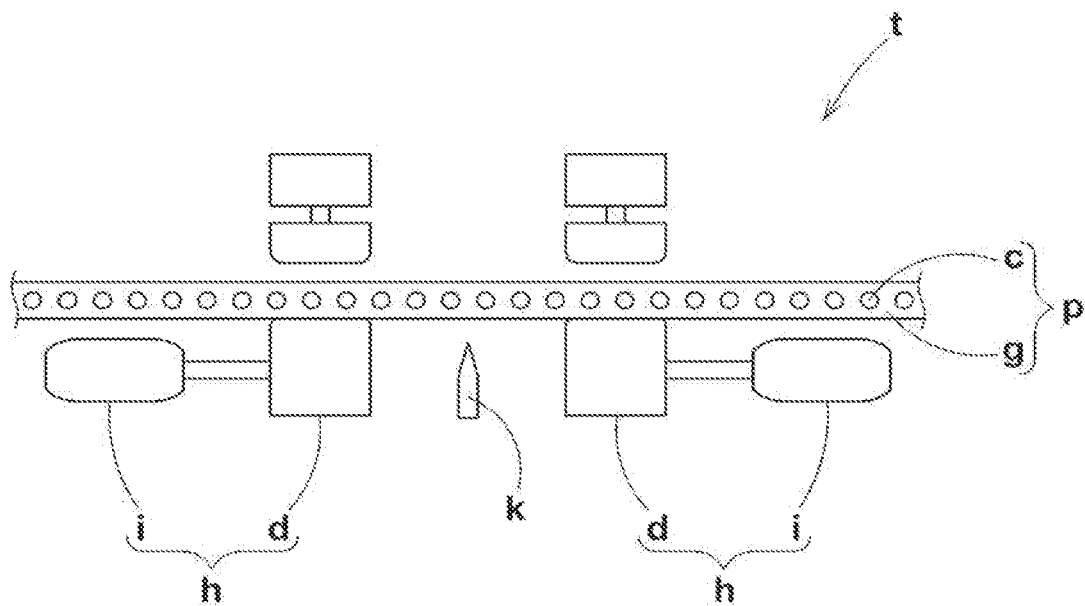
(b)
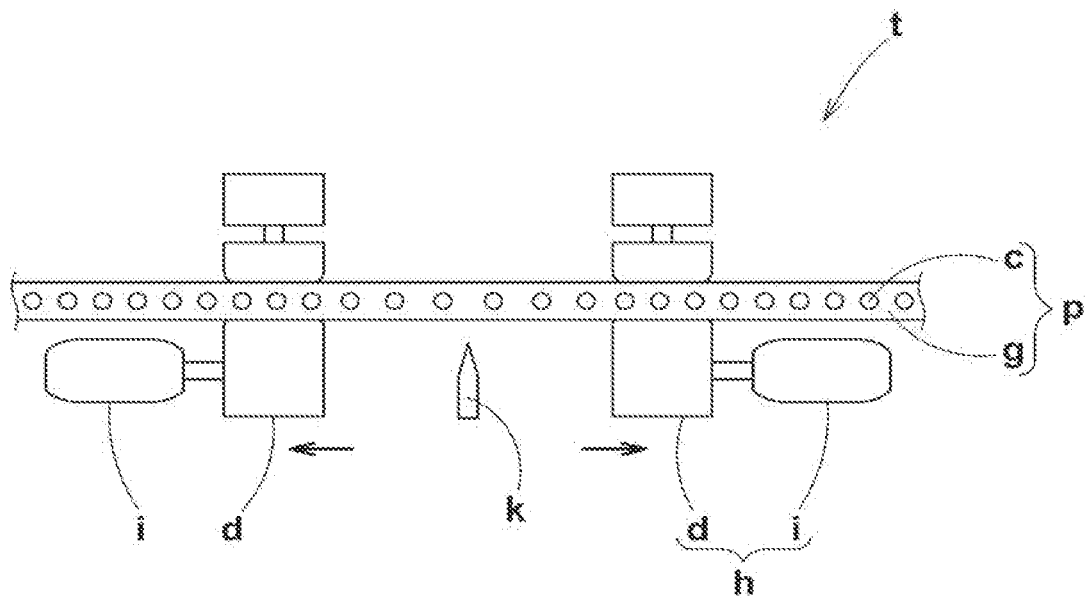

FIG.8
--BACKGROUND ART--
(a)
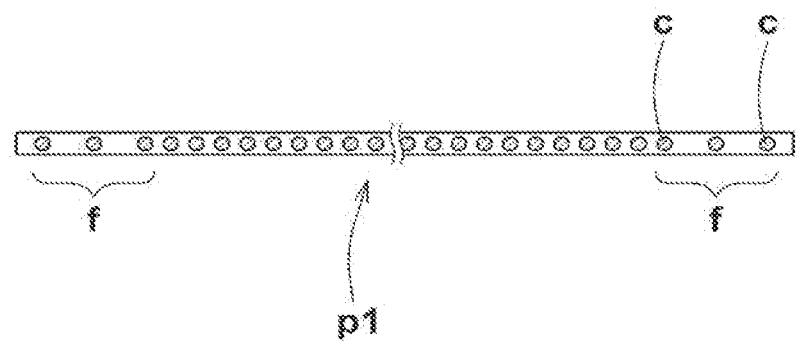
(b)
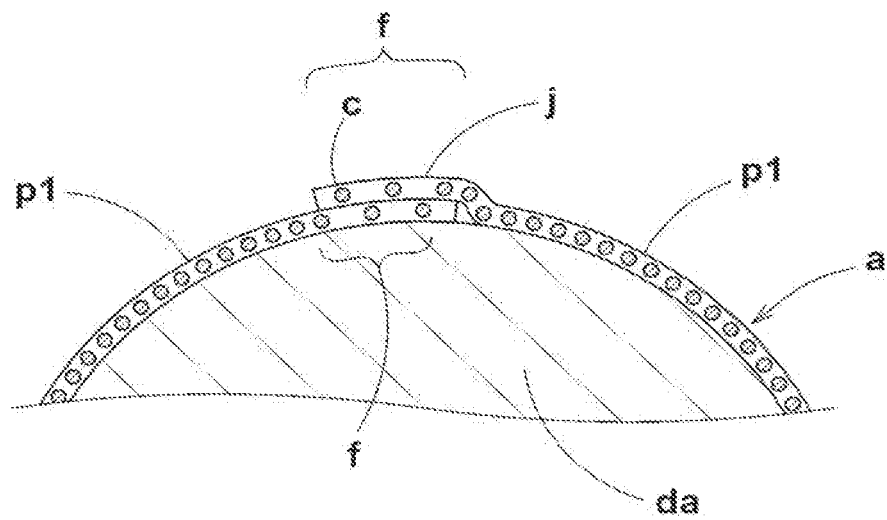

CUTTING DEVICE

TECHNICAL FIELD

The present invention relates to a device for cutting a ply for a tire and a cutting method using the same.

BACKGROUND ART

As shown in FIG. 7 (a), a cutting device t for cutting a ply p for a tire in which a plurality of cords c are covered with an unvulcanized topping rubber g has been known. The cutting device t has a pair of holding tools h, h for holding the ply p at two positions separated in a direction orthogonal to the longitudinal direction of the cords c, and a cutting tool k for cutting the ply p between the holding tools h and h. Each holding tool h has a main part d which presses and holds the ply p, and a moving part i for further separating each main part d along the orthogonal direction.

In the method for cutting the ply p using the cutting device t, firstly, the ply p is held by the separated main parts d and d. Secondly, the respective main parts d are further separated by being moved by the same distance with the moving parts i.

Thereby, as shown in FIG. 7 (b), the pitches of the cords c in the ply p between the main parts d and d are uniformly increased. Then, at a substantially intermediate position between the main parts d and d, the ply p is cut with the cutting tool k.

Thus, a ply piece p1 formed by cutting the ply p as shown in FIG. 8 (a) has a portion in each of the end parts f, f where the pitches of the cords c are wider, and a portion between both of the end parts f, f where the pitches of the cords c are smaller.

Such ply piece p1 is, for example as shown in FIG. 8 (b), wound one turn in a circumferential direction around and on a drum da, and then the end parts f, f thereof in the circumferential direction are connected to each other to form a cylindrical rubber member (a).

In the rubber member (a), as the pitches of the cords c are equalized between the joint portion j of the ply piece p1 and the portion other than the joint portion j, their rigidity difference becomes small, and the joint portion j and the other portion uniformly expand when the internal pressure is applied. Thereby, the occurrence of a so-called dent in which the joint portion j is recessed in a band-like shape is suppressed.

In the above described cutting device t, however, as the main parts d and d move in opposite directions to each other, if any one of the moving parts i fails for example, then the moving distances of both main parts d, d become different, therefore, the pitches of the cords c do not increase uniformly. Thus, there is a problem such that the ply piece p1 cannot be formed with high accuracy.

PRIOR ART DOCUMENT

Patent Document

Patent document 1: Japanese Patent Application Publication No. 2010-125665

SUMMARY OF THE INVENTION

Problem to be Solved by the Invention

The present invention was devised in view of the above situation, and a primary object is to provide a cutting device for accurately cutting a ply for a tire, and a cutting method using the same.

Means for Solving the Problem

The present invention is a cutting device for cutting a ply for a tire in which a plurality of cords parallelly arranged at fixed pitches are coated with an unvulcanized topping rubber, which is characterized by having a pitch increasing means for increasing the pitches of the cords by pressing the ply from a second surface side to a first surface side of the ply so as to stretch the ply toward the first surface side, and a ply cutting means disposed on the first surface side of the ply, for cutting the stretched portion of the ply along the cords.

In the cutting device according to the present invention, it is preferable that the pitch increasing means comprises a pair of holding tools for holding the ply at positions separated from each other in a direction orthogonal to the longitudinal direction of the cords, and a pressing tool for projecting the ply between the holding tools toward the first surface side.

In the cutting device according to the present invention, it is preferable that each of the holding tools has a section which sandwiches the ply between a protruding part, and a recessed part engaged with the projecting part.

In the cutting device according to the present invention, it is preferable that the ply cutting means has a cutter blade.

It is preferable that the cutting device according to the present invention further comprises a cord cutting means for cutting the cords in a direction orthogonal to the longitudinal direction of the cords.

The present invention is a cutting method of cutting a ply for a tire in which a plurality of cords parallelly arranged at fixed pitches are coated with an unvulcanized topping rubber, which is characterized by having a pitch expansion step of increasing the pitches of the cords by pressing the ply from a second surface side to a first surface side of the ply so as to stretch the ply toward the first surface side, and a ply cutting step of being disposed on the first surface side of the ply, and cutting the stretched portion of the ply along the cords.

Effects of the Invention

The cutting device according to the present invention is for cutting a ply for a tire in which a plurality of cords parallelly arranged at fixed pitches are coated with an unvulcanized topping rubber. The cutting device has the pitch increasing means for increasing the pitches of the cords by pressing the ply from the second surface side to the first surface side of the ply so as to stretch the ply toward the first surface side, and the ply cutting means disposed on the first surface side of the ply, for cutting the stretched portion of the ply along the cords.

In such cutting device, as the ply is stretched toward only one direction by the pitch increasing means, the pitches of the cords can be increased uniformly. Thus, the cutting device according to the present invention can accurately cut the ply.

BRIEF DESCRIPTION OF THE DRAWINGS

FIG. 3 (a), (b) are side views for illustrating the method of cutting the ply using the cutting device of FIG. 1

FIG. 4 (a), (b) are side views for illustrating the method of cutting the ply using the cutting device of FIG. 1

(b) is a cross-sectional view for explaining the manufacturing of the rubber member by using the ply piece of (a).

MODE FOR CARRYING OUT THE INVENTION

Hereinafter, an embodiment of the present invention is described with reference to the drawings.

Figure 1:
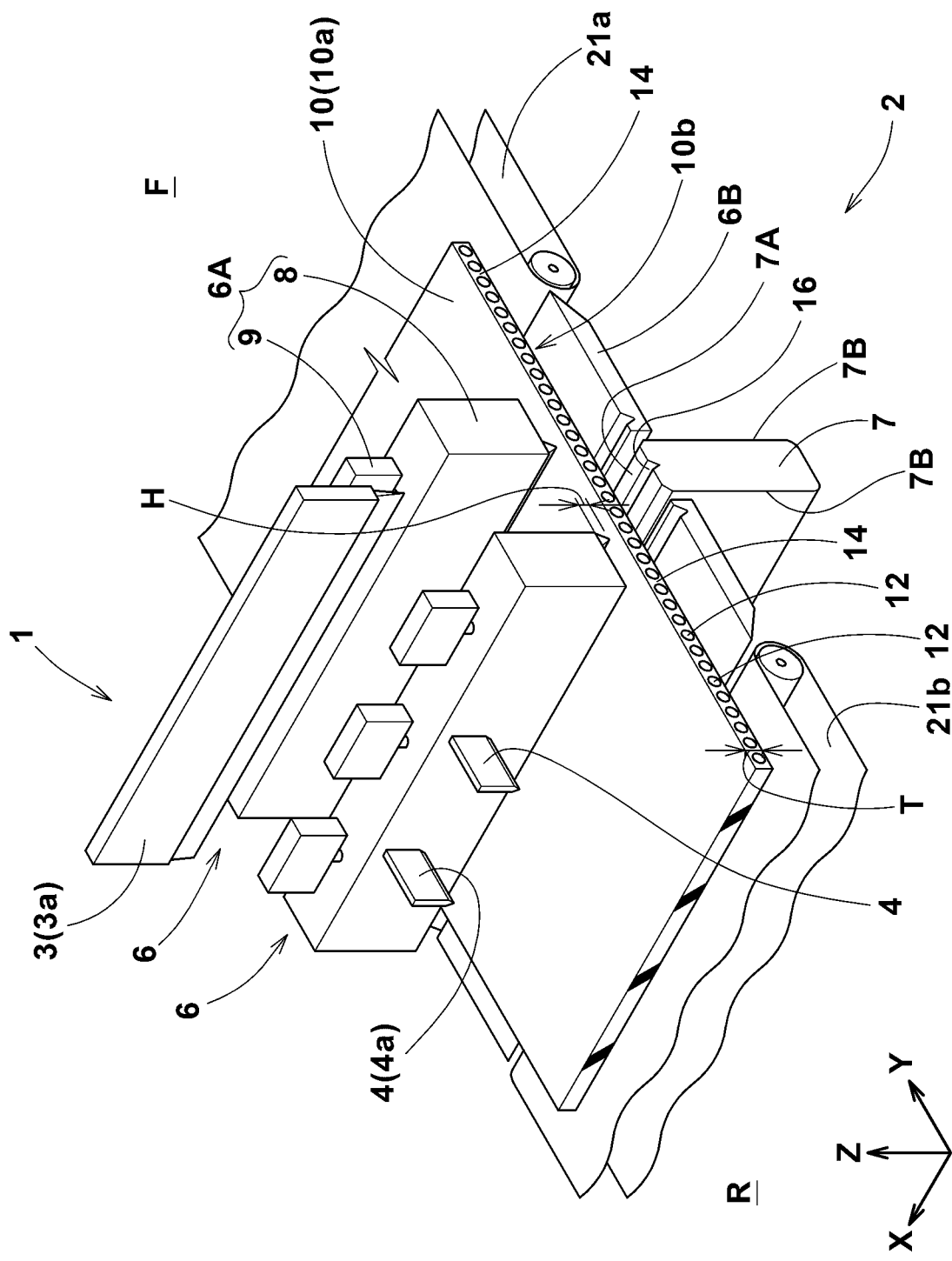
FIG. 1 a perspective view of a ply cutting device showing an embodiment of the present invention FIG. 2 (a), (b) are side views for illustrating a method of cutting the ply using the cutting device of FIG. 1

FIG. 1 is a perspective view of a cutting device 1 for a ply 10 for a tire according to an embodiment of the present invention. The ply 10 is a plurality of cords 12 parallelly arranged at constant pitches and coated with an unvulcanized topping rubber 14.

As to the ply 10, in the present embodiment, as shown in FIG. 1, a long belt-like one is used.

Figure 5:
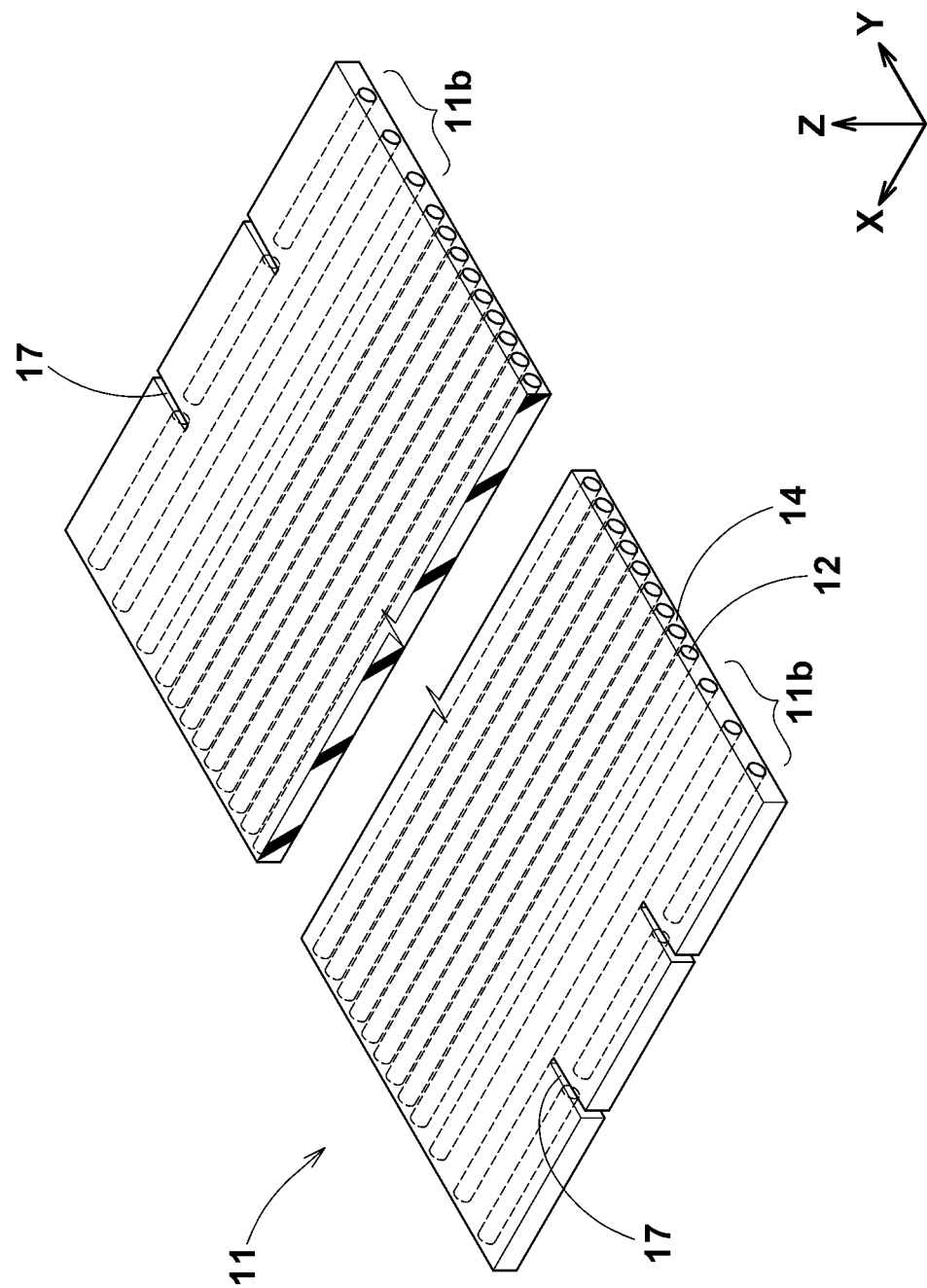
FIG. 5 a ply piece cut by the cutting device of FIG. 1

The ply 10 cut by the cutting device 1 is formed as a short ply piece 11 (shown in FIG. 5).

For the cords 12, various materials, for example, steel, organic fibers such as polyester, nylon, rayon and aramid may be selected.

It is preferable that the diameter d (shown in FIG. 2 (b)) of the cords 12 is about 0.5 to 0.8 mm, for example.

The cutting device 1 according to the present embodiment is associated with transfer devices 21a, 21b composed of, for example, belt type conveyers, on the upstream side F and on the downstream side R of the cutting device.

Thereby, the ply 10 is automatically conveyed from the upstream side F to the downstream side R passing through the cutting device 1.

On the further downstream side R of the cutting device, for example, there is disposed a shaping drum (not shown) for sticking the a ply piece 11 together.

The cutting device 1 comprises a pitch increasing means 2 for increasing the pitches of the cords 12 by stretching the ply 10, a ply cutting means 3 for cutting the stretched ply 10, and a cord cutting means 4 for cutting the cords 12 of the ply 10.

The pitch increasing means 2 in the present embodiment comprises a pair of holding tools 6, 6 for holding the ply 10 at positions separated from each other in a direction orthogonal to the longitudinal direction of the cords 12 (hereinafter, simply referred to as the "cord arrangement direction"), and a pressing tool 7 for pressing the ply 10 between the paired holding tools 6, 6.

In each of the Figures in this specification,

Y denotes the cord arrangement direction,

X denotes the longitudinal direction of the cords 12, and

X denotes the vertical direction.

The holding tool 6 according to the present embodiment comprises a first part 6A disposed on the first surface 10a side of the ply 10, and a second part 6B disposed on the second surface 10b side of the ply 10.

However, it is also possible to dispose the first part 6A on the second surface 10b side, and the second part 6B on the first surface 10a side.

The first part 6A in the present embodiment comprises a main part 8 for contacting and pressing the ply 10, and a cylinder mechanism 9 of a known structure for moving the main part 8 along the vertical direction.

As shown in FIG. 2 (a), the main part 8 has, for example, a rectangular shape in the side view, and comprises a downside surface 8A for contacting with the ply 10, and a pair of lateral side surfaces 8B, 8B extending upward from both edges in the cord arrangement direction of the downside surface 8A.

The downside surface 8A has a protruding part 13 protruding toward the first surface 10a.

The protruding part 13 in the present embodiment has a triangular shape in the side view.

Such protruding part 13 increases the friction between the ply 10 and the main part 8.

The protruding part 13 has a height H (shown in FIG. 1) smaller than the thickness T of the ply 10.

The second part 6B has, for example, a rectangular shape in the side view, having an upper surface 15 for contacting with the second surface 10b of the ply 10.

The upper surface 15 has a recessed part 15a which is engaged with the protruding part 13.

The recessed part 15a in the present embodiment has a triangular shape in the side view. But, it may be a rectangular shape, for example.

In the present embodiment, the movement in the cord arrangement direction of the second part 6B is restrained by a support tool (not shown).

The pressing tool 7 is supported movably in the vertical direction by being connected to, for example, a cylinder mechanism (not shown) of a well-known structure.

The pressing tool 7 is disposed on the second surface 10b side of the ply 10 and between the paired second portions 6B, 6B.

The pressing tool 7 in this embodiment has an upper surface 7A for contacting with the ply 10, and a pair of side surfaces 7B, 7B extending downward from both edges in the cord arrangement direction of the upper surface 7A. The upper surface 7A in this embodiment is provided with a cutout part 16 recessed downward at an intermediate position in the cords arrangement direction of the upper surface 7A, The length W in the cord arrangement direction of the upper surface 7A is determined by the pitches of the cords 12 increased, and preferred is about 1.5 to 5.0 times of the diameter D (shown in FIG. 2 (b)) of the cords 12, for example.

The ply cutting means 3 in the present embodiment is disposed on the first surface 10a side.

The ply cutting means 3 comprises
a cutter blade 3a for cutting the ply 10, and
a cylinder mechanism (not shown) of a well-known structure for supporting the cutter blade 3a movably in at least the vertical direction.

The cutter blade 3a in the present embodiment extends linearly along the longitudinal direction x.

Figure 6:
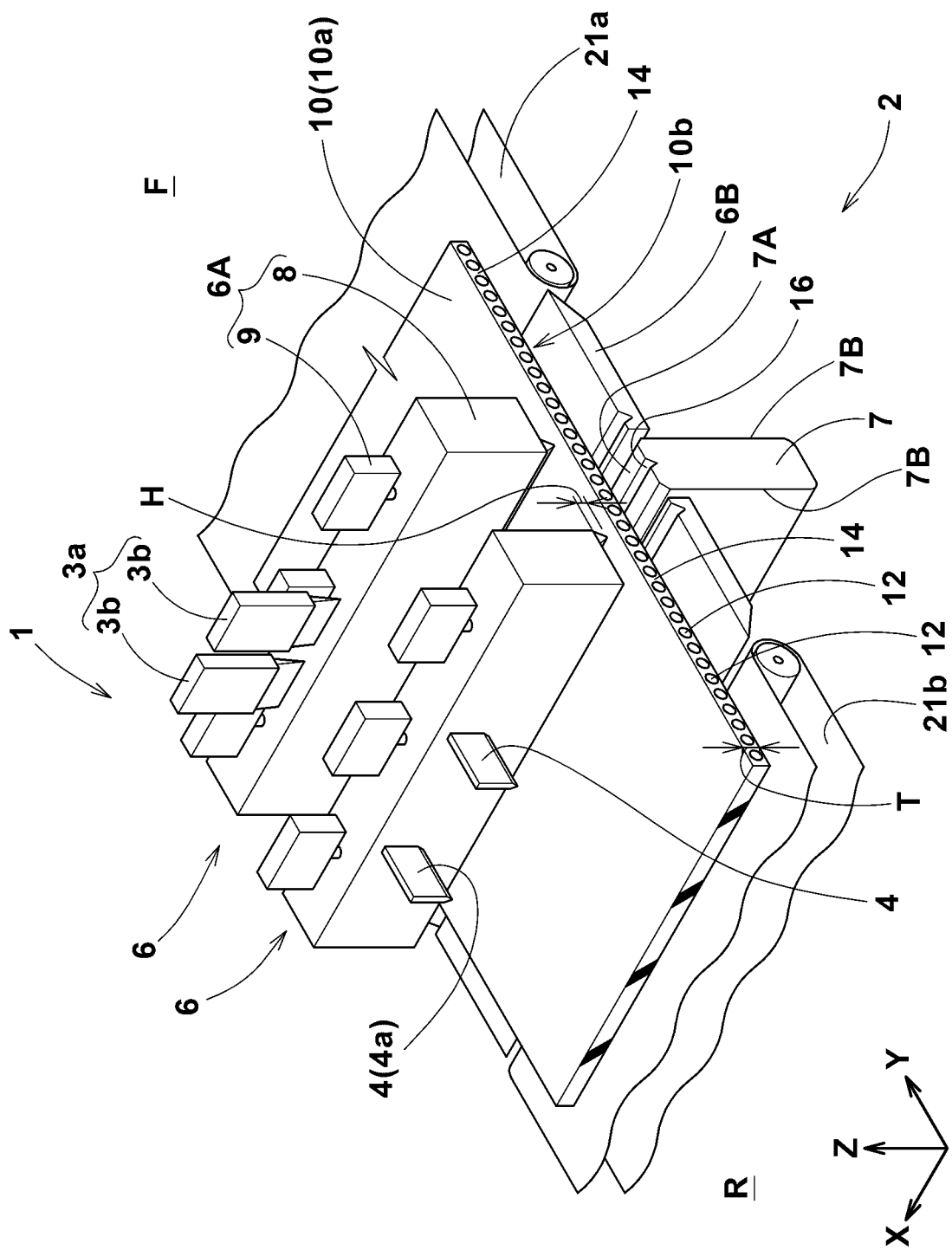
FIG. 6 a perspective view of a ply cutting device showing another embodiment of the present invention FIG. 7 (a), (b) are side views for illustrating a conventional ply cutting method FIG. 8 (a) is a side view of a ply piece cut by the conventional ply cutting method.

The cutter blade 3a may be, for example, that of a circular shape (not shown) capable of cutting the ply 10 by being pressed and moved in the longitudinal direction x relatively to the ply 10, or that made up of a pair of blade pieces 3B, 3B whose blade length is smaller than that of the cutter blade 3a in the present embodiment as shown in FIG. 6.

The cutter blade 3a in the present embodiment is engaged with the cutout part 16 of the pressing tool 7.

The cord cutting means 4 in the present embodiment is arranged on the first surface 10a side.

The cord cutting means 4 comprises, for example, a cutter blade 4a for cutting the cords 12 in the cord arrangement direction, and
an actuator 4b of a well-known structure for supporting the cutter blade 4a movably in at least the cord arrangement direction.

In the present embodiment, a plurality of the cords cutting means 4 are provided.

Next, a method for cutting the ply 10 by the use of the cutting device 1 is described.

In the present embodiment, as shown in FIG. 2 (a), firstly, the first part 6A stands by on the upper side of the ply 10.

The upper surface 15 of the second part 6B and the upper surface 7A of the pressing tool 7 are positioned at the substantially same height positions.

The ply 10 is moved by the transfer devices 21a, 21b (shown in FIG. 1) so as to be laid on the paired second portions 6B, 6B. In the present embodiment, the center between the adjacent cords 12, 12 is positioned so as to be laid on the cutout part 16 of the upper surface 7A of the pressing tool 7.

Secondly, as shown in FIG. 2 (b), by actuating the cylinder mechanism 9 of the first part 6A, the main part 8 is lowered to hold the ply 10 between the main part 8 and the second part 6B.

At this time, as the protruding part 13 of the first part 6A and the recessed part 15a of the second part 6B are engaged with each other, a large frictional force acts on the holding tool 6 and the ply 10, therefore the movement of the held ply 10 is suppressed.

Next, as shown in FIG. 3 (a), by actuating the cylinder mechanism connected to the pressing tool 7, the pressing tool 7 pushes from the second surface 10b side to the first surface 10a side, and thereby the ply 10 between the holding tools 6, 6 is stretched toward the first surface 10a side.

In this way, as the ply 10 is stretched only in one direction (upward vertical direction), the pitches of the cords 12 are equally increased.

In the present embodiment, since the center between the adjacent cords 12, 12 is positioned so as to be laid on the cutout part 16 of the upper surface 7A of the pressing tool 7, on both sides of the cutout part 16, the pitches of the cords 12 are increased equally between the right side and left side.

In the present embodiment, the ply 10 between the holding tools 6, 6 is stretched along the side surface 7B of the pressing tool 7 and the lateral side surface 8B of the main part 8. Thereby, the ply 10 can be stretched more accurately.

The pushing-out height Ha which is the distance in the vertical direction between the upper surface 7A of the pressing tool 7 and the second surface 10b of the ply 10 is determined by the pitches of the cords 12 increased, and preferred is about 1.5 to 5.0 times the diameter D of the cords 12, for example.

Next, as shown in FIG. 3 (b), by actuating the actuator 4b of the cord cutting means 4, the cutter blade 4a of the cord cutting means 4 is moved onto the upper surface 7A of the pressing tool 7 to cut the cords 12 positioned on the upper surface 7A.

Next, as shown in FIG. 4A, by actuating the cylinder mechanism of the ply cutting means 3, the cutter blade 3a is lowered to cut the ply 10 on the upper surface 7A.

At this time, as the cutter blade 3a and the cutout part 16 are engaged with each other, it is possible to cut the ply 10 with high accuracy.

Next, as shown in FIG. 4 (b), the cutter blade 3a and the main part 8 are moved up, and the pressing tool 7 is moved down. Then, by actuating the transfer device 21b on the downstream side, the ply piece 11 formed by cutting is moved to the downstream side.

At this time, the cords 12 of the ply 10 stretched by the pressing tool 7 have a desired pitches owing to the shrinkage of the topping rubber 14.

Incidentally, in the end portion (not shown) on the downstream side of the ply piece 11, the pitches of the cords 12 are properly increased in advance according to the cutting method of the present embodiment.

FIG. 5 shows one embodiment of the ply piece 11 formed by such cutting method.

The ply piece 11 in this embodiment is provided in both end portions 11b, 11b in the cord arrangement direction with cuts 17 formed by the cord cutting means 4, Thereby, the rigidity of the part where both the end portions 11b, 11b are connected, can be more effectively reduced, and the occurrence of dent can be suppressed.

While detailed description has been made of an especially preferable embodiment of the present invention, the present invention can be embodied in various forms without being limited to the above-described specific embodiment.

DESCRIPTION OF SYMBOLS 1 cutting device
2 pitch increasing means
3 ply cutting means
10 ply
12 cord
14 topping rubber
10a first surface
10b second surface

The invention claimed is:
1. A cutting device for cutting a ply for a tire in which parallel cords arranged at fixed pitches are coated with an unvulcanized topping rubber, comprising:
a pitch increasing device for increasing the pitches of the cords by pressing the ply from a second surface side to a first surface side of the ply so as to stretch the ply toward the first surface side, and
a ply cutting tool disposed on the first surface side of the ply, and comprising a cutter blade for cutting the stretched portion of the ply along the cords, wherein
the pitch increasing device comprises:
a pair of holding tools for holding the ply at positions separated from each other in a direction orthogonal to the longitudinal direction of the cords, and
a pressing tool for projecting a portion of the ply between said positions, toward the first surface side so as to increase the pitches of the cords in said portion,
wherein
the pressing tool has
an upper surface for contacting with the second surface of the ply where the pitches of the cords are increased, and
a pair of side surfaces extending downward from both edges in the cord arrangement direction of the upper surface,
the upper surface is provided with a cutout part recessed downward at an intermediate position in the cords arrangement direction of the upper surface, and
the cutter blade is movable from the first surface side to the second surface side to engage with the cutout part, whereby, the portion of the ply where the pitches of the cords are increased is cut while the second surface thereof is supported by the upper surface of the pressing tool.

2. The cutting device as set forth in claim 1, wherein each of the holding tools has a section which sandwiches the ply between a protruding part, and a recessed part engaged with the projecting part.

3. The cutting device as set forth in claim 2, wherein the pressing tool is movable from a position in the vertical direction of the second surface of the ply toward the first surface side so that said upper surface of the pressing tool is reachable to a height (Ha) in the vertical direction from the second surface of the ply which height is in a range from 1.5 to 5.0 times a diameter of the cords.

4. The cutting device as set forth in claim 3, wherein the dimension (W) in the cord arrangement direction of said upper surface of the pressing tool is in a range from 1.5 to 5.0 times the diameter of the cords.

5. The cutting device as set forth in claim 4, wherein the cutter blade extends linearly along the longitudinal direction of the cords.

6. The cutting device as set forth in claim 4, wherein the cutter blade is a circular blade movable in the longitudinal direction of the cords.

* * * * *